(12) United States Patent
Termorshuizen et al.

(10) Patent No.: US 11,434,328 B2
(45) Date of Patent: Sep. 6, 2022

(54) METHOD FOR THE PRODUCTION OF POLYETHER POLYOLS

(71) Applicant: Huntsman International LLC, The Woodlands, TX (US)

(72) Inventors: Paul Anton Termorshuizen, Bekkevoort (BE); Hector Cantero, Zwijnaarde (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 390 days.

(21) Appl. No.: 16/477,048

(22) PCT Filed: Jan. 18, 2018

(86) PCT No.: PCT/EP2018/051163
§ 371 (c)(1),
(2) Date: Jul. 10, 2019

(87) PCT Pub. No.: WO2018/137987
PCT Pub. Date: Aug. 2, 2018

(65) Prior Publication Data
US 2021/0221951 A1    Jul. 22, 2021

(30) Foreign Application Priority Data
Jan. 25, 2017 (EP) ..................... 17153018

(51) Int. Cl.
*C08G 65/30* (2006.01)
*C08G 65/10* (2006.01)

(52) U.S. Cl.
CPC ............. *C08G 65/30* (2013.01); *C08G 65/10* (2013.01)

(58) Field of Classification Search
CPC ......... C07C 29/74; C07C 29/88; C07C 41/34; C08G 65/10; C08G 65/30
See application file for complete search history.

(56) References Cited

U.S. PATENT DOCUMENTS

| 4,306,943 A | 12/1981 | Mori et al. |
| 4,535,189 A * | 8/1985 | Cuscurida ............... C07C 41/34 568/678 |
| 5,457,246 A | 10/1995 | Ho |
| 2015/0133696 A1 * | 5/2015 | Den Heeten ............ C07C 41/34 568/621 |

FOREIGN PATENT DOCUMENTS

| EP | 671361 A1 * | 9/1995 | ............... C01D 5/16 |
| EP | 671361 A1 | 9/1995 | |
| PL | 201621 B | 4/2009 | |
| PL | 217963 B | 9/2014 | |
| SK | 1800-2001 A | 3/2005 | |
| WO | 2010/145899 A | 12/2010 | |
| WO | 2013/178410 A | 12/2013 | |

OTHER PUBLICATIONS

EP0671361 English Machine Translation, prepared May 18, 2022. (Year: 2022).*
M. Ionescu, Chemistry and Technology of Polyols for Polyurethanes, 2005, p. 129-165.
Rodriguez et al., Organic Process Research and Development, 2010, vol. 14, No. 1, p. 199-204.
International Search Report in corresponding PCT Application PCT/EP2018/051163, completed Feb. 16, 2018 dated Feb. 26, 2018.

* cited by examiner

*Primary Examiner* — Christopher M Rodd
(74) *Attorney, Agent, or Firm* — Huntsman International LLC; Robert Diaz

(57) ABSTRACT

The invention is related to a method for preparing polyether polyols, wherein the method comprises the steps of: a) providing a crude polyether polyols and a base catalyst; b) mixing the crude polyether polyols mixture with an acid thereby providing a neutralized polyether polyols mixture; c) removing water from the neutralized polyether polyols mixture, thereby providing a dehydrated neutralized polyether polyols mixture comprising polyether polyols and a suspension of the crystallized salts suspended in the polyether polyols; d) separating the polyether polyols from the crystallized salt by filtration resulting in a filtration cake comprising crystallized salts and remaining polyether polyols around the crystals; e) removing polyether polyols from the filter, leaving a filtration cake; f) redissolving the filtration cake obtaining a mixture of a salt solution and the remaining polyether polyols; and separating and removing the remaining polyether polyols from the salt solution.

14 Claims, 2 Drawing Sheets

METHOD FOR THE PRODUCTION OF POLYETHER POLYOLS

CROSS-REFERENCE TO RELATED APPLICATIONS

This application is the National Phase of International Application PCT/EP2018/051163 filed Jan. 18, 2018, which claims priority to European Application No. 17153018.1 filed Jan. 25, 2017. The noted applications are incorporated herein by reference.

The present invention is related to the production of polyether polyols and more in particular to the work-up of the production process for making polyether polyols.

Methods for preparing polyether polyols, also sometimes referred to as poly(alkylene oxide) polyols, typically involve reacting starting compounds having a plurality of active hydrogen atoms with one or more alkylene oxides in the presence of a base catalyst, preferably a strong base such as potassium hydroxide. Suitable starting compounds are a.o. polyfunctional alcohols, typically comprising 2 to 6 hydroxyl groups. Examples of such alcohols are glycol, e.g. diethylene glycol, dipropylene glycol, glycerol, di- and polyglycerols, pentaerythritol, trimethylolpropane, diethanolamine, triethanolamine, sorbitol, mannitol, etc. Alkylene oxides used are typically ethylene oxide, propylene oxide, butylene oxide or mixtures of two or more of these.

After the addition of the alkylene oxides to the starting material, crude, basic polyether polyols are obtained, which needs neutralization of the base catalyst. After neutralization, several steps are required to provide polyether polyols meeting the specifications for further use in applications. The polyether polyols may e.g. be used as a raw material in polyurethane production, where the polyols are, in general, reacted with a polyisocyanate component, such as methylene diphenyl diisocyanate (MDI) or toluene diisocyanate (TDI).

After neutralization of the base catalyst with an aqueous solution of an acid, water is removed to achieve a low water content in the product and to induce the formation of salt crystals from the alkaline catalyst and the neutralizing acid.

The salt crystals are then removed by filtration to provide polyether polyols. This procedure is e.g. described in U.S. Pat. No. 4,306,943 and in WO 2013/178410. The resulting filtration cakes containing the salt crystals are handled and disposed-off as waste.

A disadvantage of this method is that the cake must be treated as organic chemical waste due to its high content polyether polyols (up to 50% of the total weight of the cake).

The present invention aims to provide a process for working up polyether polyols, wherein losses of the polyether polyols are avoided and the yield of the process for making the polyether polyols is increased.

Further, the present invention aims to provide a process wherein the waste is in the form of an aqueous solution which can be handled more easily as waste water in standard installations, as this waste is free of residual high molecular weight organics, i.e. polyols in this invention.

Further, it is an object of current invention to provide a method for working up or preparing polyether polyols that have a higher quality, and wherein the quality-damaging high polymer fraction, which is typically present in processes for making polyether polyols, is removed.

According to the present invention, a method for working up polyether polyols is provided wherein the method comprises the steps of:

a) providing a crude polyether polyols mixture comprising polyether polyols and a base catalyst;
b) mixing the crude polyether polyols mixture with an aqueous solution of an acid thereby neutralizing said base catalyst and providing a neutralized polyether polyols mixture;
c) removing at least part of the water from the neutralized polyether polyols mixture, thereby providing a dehydrated neutralized polyether polyols mixture comprising polyether polyols and a suspension of the crystallized salts suspended in the polyether polyols, which salts result from the neutralization of the base catalyst by the acid;
d) separating the polyether polyols from the crystallized salt by filtration resulting in a filtration cake comprising crystallized salts and remaining polyether polyols around the crystals;
e) removing at least part of the polyether polyols from the filter, leaving a filtration cake;
f) redissolving the filtration cake obtaining a mixture of a salt solution and the remaining polyether polyols;
g) separating the remaining polyether polyols from the salt solution;
h) removing at least part of the remaining separated polyether polyols from the salt solution.

The base catalyst used to catalyze the reaction between the alkylene oxides and the starting compounds having a plurality of active hydrogen atoms, is typically a strong base such as an alkali metal hydroxide, e.g. sodium hydroxide, potassium hydroxide or cesium hydroxide, or mixtures thereof, whereas most preferably potassium hydroxide is used. Typically an amount in the range of 0.05 to 2 wt %, e.g. in the range of 0.10 to 0.5 wt % and most preferred an amount in the range of 0.13 to 0.40 wt % of catalyst based on the total weight of the polyether polyols to be prepared in the crude polyether polyols mixture, is used in the reaction mixture during the polymerization reaction.

The crude polyether polyols mixture is provided by catalytically polymerizing a starting compound with alkylene oxides (also referred to as epoxides). Suitable starting compounds having a plurality of active hydrogen atoms can be polyfunctional alcohols (typically comprising 2 to 6 hydroxyl groups e.g. diethylene glycol, dipropylene glycol, glycerol, di- and polyglycerols, pentaerythritol, trimethylolpropane, diethanolamine, triethanolamine, sorbitol, mannitol, ethylene glycol, 1,2-propylene glycol, sucrose, 1,2,6-hexanetriol) or polyamines such as ethylene diamine and diaminodiphenylmethane (MDA), and any combination thereof.

The alkylene oxides used are typically ethylene oxide (EO), propylene oxide (PO), butylene oxides (BO) or mixtures of two or more of these. The polyether polyols comprising more than one type of alkylene oxide may be so-called block polyether comprising at least two different alkylene oxides, obtained e.g. by reacting the starting compound with one of the alkylene oxide components. After termination of this polyaddition reaction, the intermediate polyether polyols is reacted with an other of the alkylene oxides. This sequential addition of blocks of alkylene oxides can be repeated. As such blocks of different alkylene oxides are added to the polyether polyols.

The polyether polyol comprising more than one type of alkylene oxide may be a so-called random polyether comprising at least two different alkylene oxides, obtained e.g. by reacting the starting compound with a combination of at least two different alkylene oxide components. After termination of this polyaddition reaction, the different alkylene oxides will be at random in the sequences of the polyether chains.

It is understood that also a combination of blocks of only one alkylene oxide, and blocks of at random placed alkylene oxides may be provided to the polyether polyols.

Though polyols with an EO content up to 100% can be used, most preferably, the polyether polyol comprises less than 80% EO, an EO content of up to 80% EO, and most preferred an EO content in the range of up to 60. The EO content is the number of EO-monomers in the polyol over the total of alkyloxide monomers in the polyol, expressed as a percentage. These EO may be present at random or as blocks, and are preferably combined with PO in the polyether polyol. Most preferably the polyether polyol is a combined EO-PO polyether polyol, meaning that the polyether polyol is provided by reacting the starting component with alkylene oxides selected from EO and PO only, and this at random or in sequences to provide block polymers.

The polyether polyols may be EO tipped, which means that at least the last alkylene oxide added to the polyol is an EO. Hence according to some embodiments of the present invention, the EO content of the polyether polyol may be in the range of up to 80%.

The crude, alkaline, polyether polyol mixture is mixed with an acid, provided as an aqueous acid solution. The base catalyst is thereby neutralized. To neutralize the crude polyether polyol, a mono- or polyprotic acid is added to the unneutralised polyether polyol, such that "A" moles of the mono- or polyprotic acid are added to the unneutralised polyether polyol, such that B<n*A, wherein B are the moles of protons necessary to completely neutralize the crude polyether polyol and n being the number of protons which said mono- or polyprotic acid can donate.

As the base catalyst is typically an alkali metal hydroxide, B typically is the number of moles of alkali metal hydroxide in the crude polyether polyol. When a monoprotic acid such as hydrogen chloride (HCl) is used, typically 1.00 to 1.064 moles of monoprotic acid per mole of alkali metal hydroxide is added. For diprotic acids, such as adipic acid, typically 0.50 to 0.53 mole of acid per mole of alkali metal hydroxide is added.

The acidity of the neutralized polyether polyol, i.e. the acid value, is expressed as the weight of KOH (mg) per gram of polyether that needs to be added to neutralize the acid. Typically the neutralized polyether polyol has an acid value of 0.01 to 0.1 mgKOH/g.

The acid used to neutralize the base catalyst is added as such in combination with water that is added, or as an aqueous solution. This water may be added all as part of the aqueous acid solution, or alternatively, only a part of this water is used to provide the acid aqueous solution, the remaining water is added separately.

Typically 0.5 to 10 parts by weight of water is added per 100 parts by weight of the polyether polyol in the crude polyether polyol.

Suitable acids are a.o. anorganic acids such as $H_2SO_4$, $H_3PO_4$, HCl, $CO_2$ (added as gas forming $H_2CO_3$ in water) or organic acids such as formic acid, tartaric acid, adipic acid, oxalic acid, malonic acid, succinic acid, glutaric acid, maleic acid, fumaric acid, acetic acid, citric acid, pimelic acid, suberic acid, azelaic acid and sebacic acid, or any mixture of these acids.

According to some embodiments of the present invention, an aqueous acid solution of the acid may be used to neutralize the crude polyether polyol mixture. Typically, when KOH or NaOH is used as base catalyst, and adipic acid is used to neutralize the crude polyether polyol, 0.49 to 0.56 moles of adipic acid, and preferably 0.5 to 0.53 moles of adipic acid are added for each mole of KOH or NaOH.

The crude, alkaline, polyether polyol mixture is preferably brought or kept at a temperature of 25 to 150° C., e.g. at a temperature in the range of 70 to 150° C., more preferred at a temperature of 80° C. to 150° C. before, during and/or after neutralization.

After neutralization of the crude, alkaline, polyether polyol mixture, at least a part of the water present in this mixture is removed thereby providing a dehydrated neutralized polyether polyol mixture comprising the polyether polyol and the salt formed by the base catalyst and the added acid. Because of the removal of at least part of the water, some or all the salt is crystallized and hence provides salt crystals. By forming the crystals also some polyether polyols get entrapped in the crystals, or reside on the crystals forming a cake. According to this invention the cake substantially comprises crystallized salts of the base catalyst and the acid and the so called "remaining polyether polyols" which are the polyether polyols that are entrapped in the crystals and/or reside on the crystals.

This dehydration process may be a distillation process, i.e. by heating the crude neutralized polyether polyol mixture to remove the water and/or subjecting the crude neutralized polyether polyol mixture to a vacuum for removing at least part of the water. Most preferred, the temperature of the crude neutralized polyether polyol mixture is brought or kept in the range of 25 to 250° C., such as in the range of 70 to 160° C., and more preferred in the range of 80 ° C. to 140° C., while the pressure of the reactor is brought to a pressure of 0.20 to 0.01 bara.

The term "bara" means "bar absolute", i.e. the pressure expressed in the unit bar, zero-referenced against a perfect, i.e. absolute, vacuum. One bar equals 100000 Pa.

The water content of the dehydrated neutralized polyether polyol mixture after removal of at least part of the water is in the range of 0.00 to 5.00% w, more preferably in the range of 0.01 to 3.00% w, and more preferred in the range of 0.10 to 1.00% w.

In one embodiment, the dehydration can be done in two steps, wherein after de first dehydration, the cake is redissolved again by adding water thereby providing a second neutralized polyether polyol mixture, which is then dehydrated again by removing at least part of the water. This way forming again a cake. As described in WO 2013/178410, this way the crystals have a larger crystal size and have a more narrow size distribution which facilitates separation by filtration.

After dehydration the polyether polyols are separated from the cake. The separation of the cake is preferably done via a filtration step where the polyether polyols flow through a filter, which retains the salt crystals on the filter and let the polyol and water, if still present, pass through the filter.

Hence according to some embodiments of the present invention, removal of the salt crystals may be obtained by filtration using a filter.

In one preferred embodiment, the filtration is done by a candle filter. The cake can remain on the inside or the outside of the filter. The filtrate coming out of the filter comprises polyether polyols.

The polyether polyols are then removed from the filter and can be stored and/or used further e.g. for the production of polyurethanes.

In one embodiment, when using a filter for separating the polyether polyols from the cake, the separation of the polyether polyols from the cake further comprises the step of adding an inert gas to the filter, preferably under pressure, so that further polyether polyols are pushed out of the filter, leaving the cake on the filter. Preferred inert gasses are nitrogen or argon.

In this embodiment a preferred filter arrangement is an "inside-out" candle filter. A candle filter is known in the art and comprises a vessel surrounding several candles, which candle comprises filtering elements. Using such filter leads to leaving the cake on one side of the candle, and letting through the filtrate on the other side of the candle. In the inside-out candle filter, upon filtration the cake remains inside the candles of the filter and the filtrate leaves the candle on the outside. This configuration allows a full emptying of the candles and the filtering device wherein the candles are present.

In case an "outside-in candle filter" is used where upon filtration the cake remains outside the filter and the filtrate leaves the filter on the inside, it is often difficult to filter the last part of the dehydrated neutralized polyether polyols, with an unfiltered amount left in the vessel surrounding the outside of the candles, called a filtration heel. This filtration heel, which comprises polyether polyols and crystallized salts suspended in the polyether polyols, remains in the vessel of the filtration equipment and can be as high as 10% or even more of the total batch size. This configuration has as disadvantage that when a non compatible type of polyol needs to be made next, the heel must be either discarded as waste or stored in a separated vessel so that the heel does not contaminate the other type of polyol that needs to be filtered next. Such storage vessel often needs to be heated and agitated to keep crystals in suspension. Waste discarding of the heel or storage requires extra investment and costs. An "inside-out" filter does not have this disadvantage and use of such filter is more flexible, since it can be easily used to make other types of polyols, and no further equipment is required to store the heels.

After the separation of the polyether polyols from the cake, the filtrate, i.e. the polyether polyols, is removed and the cake is left behind on the filter. The removal can be done by draining via any means known by a person skilled in the art. The polyether polyols can then be used as e.g. raw material to make polyurethane.

In a next step, the cake is redissolved and a mixture of salt solution and the remaining polyether polyol around the crystals is obtained. The cake can be redissolved by adding an aqueous solution, e.g. an aqueous salt solution. A two-phase mixture of salt solution and the remaining polyether polyols is hereby obtained.

After redissolving, the remaining polyether polyols are separated from the aqueous salt solution.

Such separation is done in a separating device. It can be achieved by active separation e.g. using a one- or multiple steps-centrifuge or by passive separation e.g. using a separating vessel or a series of separating vessels allowing phase separation by gravity. Such passive separation can be facilitated by using coalescence-promoting devices known by a person skilled in the art such as e.g. bundles of polymer fibers.

According to a preferred embodiment, the separation of the mixture of the remaining polyether polyols from the salts solution is based on density difference between the remaining polyether polyols and the salt solution, forming at least two layers, the aqueous salt solution layer and the recovered polyether polyols layer, wherein the salt solution layer comprises a salt concentration providing a density difference that is sufficient to produce phase separation.

The separation of the mixture of remaining polyether polyols from the salt solution can be facilitated by adding extra salt to the mixture. Preferably, the salt is a salt of the base catalyst and the acid used in the process for making the polyether polyols and neutralizing the polyether polyols, respectively. Also other suitable salts can be used.

A preferred range of salt concentration of the salt solution is between 5 wt % and 60 wt %, preferably between 20 and 40 wt %, more preferably between 25 and 35 wt % based on the weight of the salt solution.

In one preferred embodiment, at least part of the separated salt solution can be removed from the separating device that is used to separate the remaining polyether polyols from the salt solution to redissolve the cake e.g. in the filter and to provide a salt solution and remaining polyether polyols. The redissolved cake can then undergo the same separation step as described above, and the salt solution obtained after the following separation, can again be used to redissolve the cake. This way the concentration of the salt in the salt solution increases after every use as redissolver of the cake.

In case the salt concentration is above a predefined level, e.g. above 60 wt %, preferably above 40 wt %, more preferably above 35 wt %, water can be added. An excess of salt concentration may result in practical problems such as salt precipitation inside the process equipment.

To keep the concentration of the salt solution inside the preferred range a control system can be used, monitoring the salt concentration using a calibrated electrical conductivity meter.

Such conductivity meters are known by a skilled person. Conductivity meters can be used inline e.g. in the form of a suitable probe. It is possible to add extra water to the separation device in case of an excessive concentration. It is also possible to discharge excess of the salt solution in the separation device to make sure that the volume in the separation device is kept to a certain predefine level. The discharged excess salt solution, which is free of polyether polyols, is discarded and handled as liquid-only waste water.

The remaining polyether polyols layer, which is typically the upper layer, separated from the salt solution layer, which is typically the lower layer, may comprises at least two sub-layers, a heavy gummy layer and a pure polyether polyols layer. Often, this heavy gummy layer is found in between the pure polyether polyols layer and the salt solution layer. The gummy layer mainly comprises a higher polymers fraction of the polyether polyols, which has inferior quality. This layer can be removed and is treated as waste. This way only a very small amount of polyol waste is produced, which is basically made of the gummy layer. Accordingly, in another embodiment the gummy layer is removed from the separation device.

After separation, at least part of the remaining separated polyether polyols are removed from the salt solution and can be stored or used together with polyether polyols e.g. as raw materials.

In case the separation is done based on density difference, preferably only at least part of the pure polyether polyols layer is removed from the separation device, which can then be used further. Preferably, when removing the pure polyether polyols layer, at least a small part of this pure polyether polyols remains in the separation device to make sure that no gummy layer leaves the separator.

The separation can be done using a series of separating vessels. Accordingly, there is another embodiment of the invention wherein the separation of the remaining polyether polyols from the salt solutions comprises the steps of:

removing all the remaining polyether polyols and a part of the salt solution from a first separation vessel;

separating the part of the salt solution and the remaining polyether polyols based on density difference between the remaining polyether polyols and the salt solution in a second separation vessel, forming at least two layers, the salt solution layer and the polyether polyols layer.

In this embodiment, the remaining polyether polyols layer may comprise further gummy layer. All the formed layers can be handled further as described above.

The inventors of current invention surprisingly found a way to recover most of the polyether polyols which otherwise would be lost as part of the cake, which is usually discarded as solid waste. Further, the inventors of current invention found a way to improve the quality of the polyether polyols by eliminating the gummy layer from the polyether polyols.

The above and other characteristics, features and advantages of the present invention will become apparent from the figures, which illustrate, by way of example, the principle of the invention. The figures are given for the sake of example only, without limiting the scope of the invention.

FIG. 1 represents a method according to the invention wherein in a work-up vessel (1) the alkaline mixture of polyether polyols and base catalyst is mixed with a mixer (2) with an acid and water to neutralize the base catalyst. This way a neutralized polyether polyols mixture is made.

Figure 1:
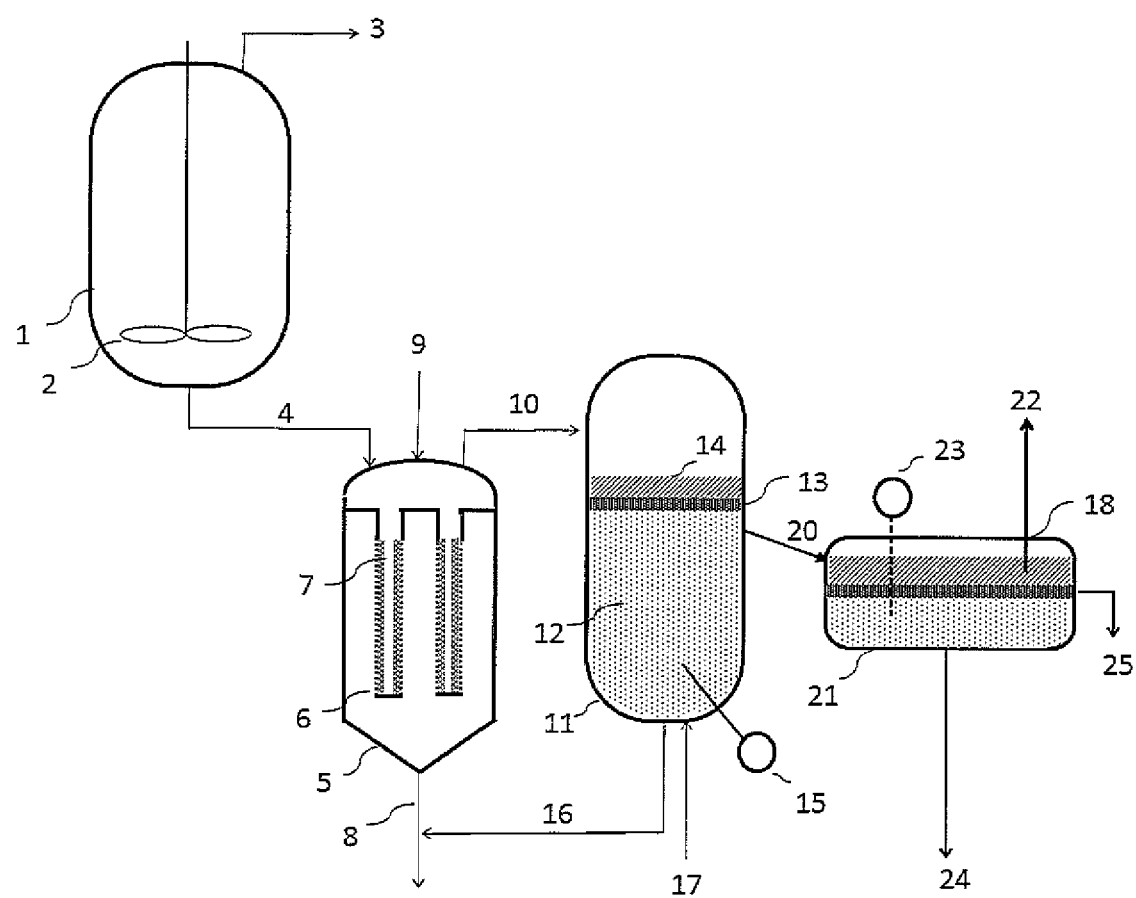
FIG. 1 is a representation of a workflow of an embodiment according to the invention.

At least part of the water is removed through a vapour line (3). The mixture of dehydrated neutralized polyether polyols comprising polyether polyols and crystallized salts suspension (4) is brought to a filter device (5) for separating the crystallized salts from polyether polyols. The cake formed comprises crystallized salts of the base catalyst and the acid and remaining polyether polyols that are entrapped in or reside on the crystallized salts.

The filter device comprises an inside-out set of porous candles (6). The mixture (4) enters the filter device and is distributed through the filter candles. The filtration cake (7) remains inside the candles, while the polyether polyol is separated from the cake and sent out of the filter (8) for further processing or storage.

Then, nitrogen (9) is applied through the filter, preferably under pressure, so that as much as possible of the polyether polyols are pushed out of the filter via the exit line (8).

The cake is then redissolved by a salt solution, preferably by a countercurrent recirculating salt stream (16) pumped via a pump from the salt vessel (11) and the redissolved salt together with the salt stream is brought via the top of the filter (10) to the salt vessel (11).

After a recirculation time that is sufficient for full redissolution of the cake, the redissolved salt solution and the remaining polyether polyols are drained from the filter using the nitrogen line (9) and fully transferred to the salt vessel (11), which is also suitable to allow separation based on density differences.

After waiting a sufficient amount of time, several layers are formed.

The bottom layer (12) comprises the denser salt solution and the top layer (14) is the pure polyether polyols layer, and in between those is a viscous gummy interlayer (13), which mainly comprises higher polyether polyols polymers.

After the three layers are formed, the salt concentration is measured using the inline probe (15) and—if necessary—water is added via an inlet (17) to keep the salt concentration within the preferred range. After the adjustment of the salt concentration, the two upper layers (13) and (14) plus a small amount of the salt layer (12) is discharged via an overflow (20), which is located below the top layer and gummy interlayer and in the bottom layer, into a second separator (21).

In this way in the salt vessel (11) only salt solution (12) remains. To prevent that the volume in the separation vessel (11) becomes too high, due to the numerous recycling and refilling of the vessel (10), there are means foreseen to remove at least part of the salt solution, which can be handled as liquid aqueous waste. The separation device has also means that only salt solution is brought back to the filter (5) via stream (16) to redissolve the cake.

The final separation can take place in a second separating vessel (21). The recovered pure polyether polyol layer is removed from the top (22), e.g. by using vacuum, via a dip-pipe (18) carefully located to avoid taking-in any of the gummy layer. The excess of salt solution transferred from the previous vessel is discharged from the bottom as liquid waste water (24). Finally, the viscous gummy interlayer is allowed to accumulate in the second separator for a number of cycles, and is removed from time to time via line (25) to be handled as chemical waste. A level sensor (23) is used to monitor and control the position of the aqueous-organic interphase by adjusting the amount of salt solution (24) discharged at each cycle.

Figure 2:
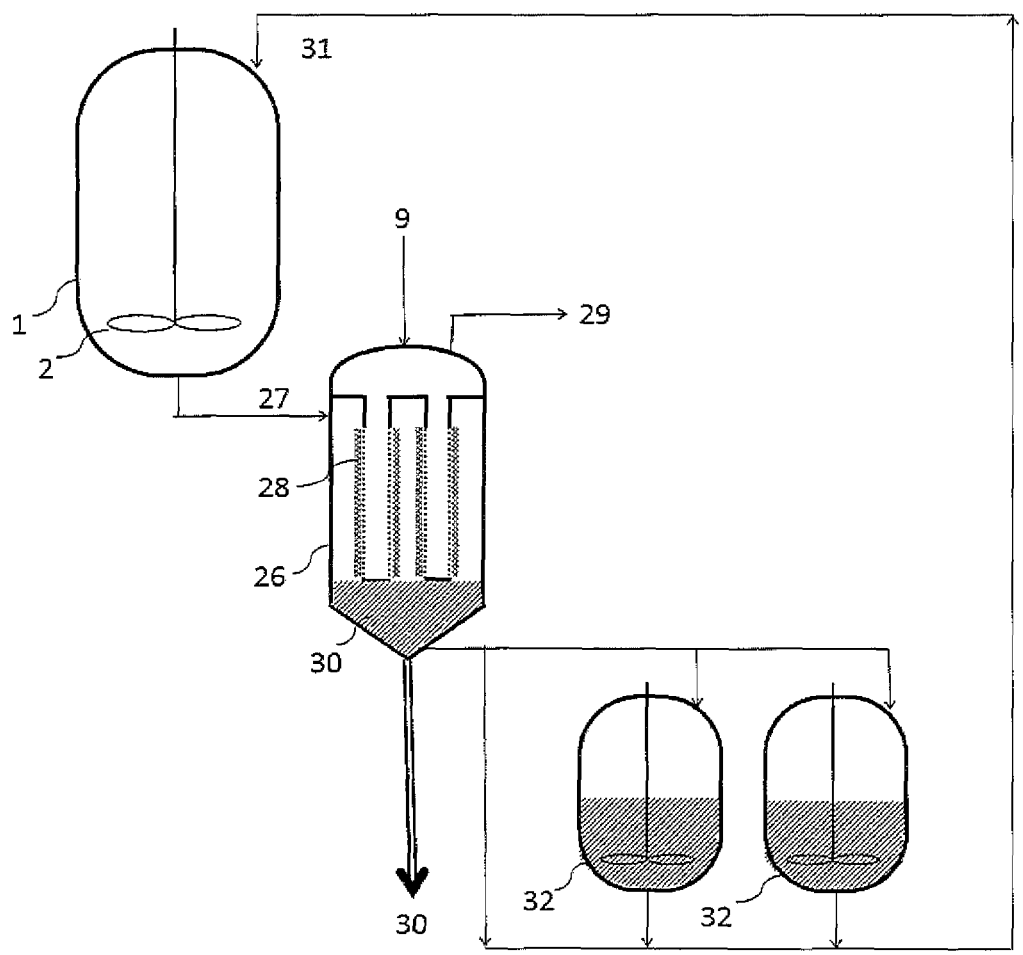
FIG. 2 is a representation of an outside-in candle filter.

As comparison, FIG. 2 represents a standard filtering device (26) comprising a candle filter arranged for outside-in filtration. Here the mixture of polyether polyols and crystallized salts from workup vessel (1) enter via stream (27) in the separating device. In this case the solid cake (28) remains on the outside of the filter candles while the polyether polyols leave via the top stream (29) for storage or further use.

The main disadvantage is that the complete cake (including up to 50% residual polyol) has to be discharged through the bottom (30), which requires solids collection, handling and transport as solid chemical waste. It may be noted that some solid cakes containing polyol may behave as pyrophoric and if left in contact with air during storage they can be prone to spontaneous smouldering, with fire risks associated to this.

A second disadvantage is that after filter drainage to remove the polyether polyols, there always remains a mixture of crystals and polyether polyols at the bottom of the separating device. This is called a filtration heel (30).

Even if nitrogen (9) is used to push the last polyether polyol through the filter, it is not possible to fully remove the heel from the device via the top stream (29). Consequently, prior to the solid cake discharge the heels need to be transferred back to the workup vessel via line (31) in the next batch cycle or (when various mutually non-compatible grades are produced in the same installation) to one or more extra stirred and heated heel vessels (32) holding it until a compatible grade is again made in the workup vessel (1).

The invention claimed is:

1. A method for preparing polyether polyols, wherein the method comprises the steps of:
    a) providing a crude polyether polyols mixture comprising polyether polyols and a base catalyst;
    b) mixing the crude polyether polyols mixture with an aqueous solution of an acid thereby neutralizing said base catalyst and providing a neutralized polyether polyols mixture;
    c) removing at least part of the water from the neutralized polyether polyols mixture, thereby providing a dehydrated neutralized polyether polyols mixture comprising polyether polyols and a suspension of the crystallized salts suspended in the polyether polyols, which salts result from the neutralization of the base catalyst by the acid;
- d) separating the polyether polyols from the crystallized salt by filtration resulting in a filtration cake comprising crystallized salts and remaining polyether polyols around the crystals;
- e) removing at least part of the polyether polyols from the filter, leaving a filtration cake;
- f) redissolving the filtration cake obtaining a mixture of a salt solution and the remaining polyether polyols;
- g) separating the remaining polyether polyols from the salt solution; and
- h) removing at least part of the remaining separated polyether polyols from the salt solution.

2. The method according to claim 1, wherein the separation of the mixture of remaining polyether polyols from the salts solution in step g) is based on density difference between the remaining polyether polyols and the salt solution, forming at least two layers, the salt solution layer and the polyether polyols layer, wherein the salt solution layer comprises a salt concentration that is sufficient to provide phase separation.

3. The method according to claim 1, wherein the separation of the mixture of remaining polyether polyols from the salts solution in step g) is facilitated by:
- adding salt to or removing water from the mixture in case the density difference is not enough to facilitate the separation, wherein the salt is preferably a salt of the base catalyst and the acid; or
- adding water to the mixture in case the salt concentration is too high.

4. The method according to claim 2, wherein the salt concentration is measured using a conductivity meter.

5. The method according to claim 2, wherein the salt concentration that is sufficient to provide phase separation is between 5 wt % and 60 wt % based on the weight of the salt solution.

6. The method according to claim 2, wherein the polyether polyols layer comprises at least two layers, a gummy layer and a pure polyether polyols layer.

7. The method according to claim 6, wherein the removing of at least part of the remaining separated polyether polyols from the salt solution in step h), comprises removing at least part of the pure polyether polyols layer and leaving the gummy layer and the salt solution.

8. The method according to claim 6, wherein the gummy layer is removed from the salt solution.

9. The method according to claim 2, wherein step (g) comprises the steps of:
- removing all the remaining polyether polyols and a part of the salt solution from a first separation vessel; and
- separating the part of the salt solution and the remaining polyether polyols based on density difference between the remaining polyether polyols and the salt solution in a second separation vessel, forming at least two layers, the salt solution layer and the polyether polyols layer.

10. The method according to claim 1, wherein at least part of the separated salt solution obtained in step h) is used to redissolve the cake in step f).

11. The method according to claim 1, wherein the separation of the polyether polyols from the cake in step d) is provided by the means of a filter.

12. The method according to claim 11, wherein the filter is an inside-out filter candle where the cake remains on the inside of the filter candle and the polyether polyols are on the outside of the filter.

13. The method according to claim 11, wherein the separation of the polyether polyols from the cake further comprises the step of adding an inert gas to the filter.

14. The method according to claim 13, wherein the step of adding an inert gas to the filter is under pressure.

* * * * *